Oct. 11, 1966  E. F. FEDORYSZYN  3,278,006
BEARING BUSHING FOR TYPE LINE CASTING MACHINE
Filed Oct. 14, 1963
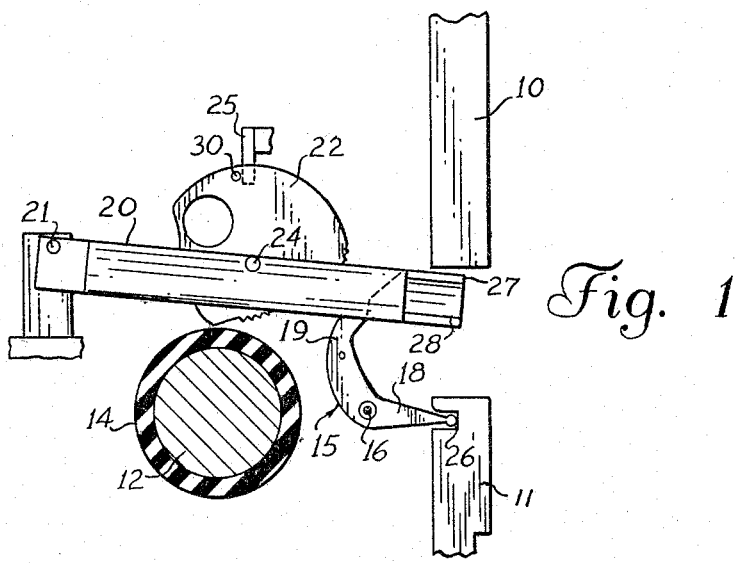
Fig. 1
Fig. 2
Fig. 3
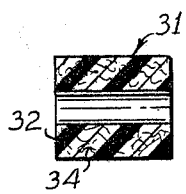
Fig. 4
INVENTOR.
Edward F. Fedoryszyn
BY
AGENT

United States Patent Office 3,278,006
Patented Oct. 11, 1966

3,278,006
BEARING BUSHING FOR TYPE LINE CASTING
MACHINE
Edward F. Fedoryszyn, 308 N. Linden St.,
Massapequa, N.Y.
Filed Oct. 14, 1963, Ser. No. 315,777
4 Claims. (Cl. 199—25)

This invention relates to type line casting machines, such as the Linotype and Intertype machines and more particularly to release mechanisms involving a trigger, a partially toothed cam and a rubber roll to rotate the cam for dropping a type matrix or "mat" from its magazine for assembly into a line. These release mechanisms are activated by the depressing of keys of a keyboard manually or automatically such as by, say, known teletypesetters.

A typical release mechanism with the trigger, cam and roll parts is shown and described in "Intertype Book of Instruction" Intertype Corporation, Brooklyn 2, New York (1943), pp. 2 and 3. Maintenance instructions for these parts are found in this publication at pages 7, 11, 435 and 438.

The invention pertains more particularly to bearings for the cam and trigger and their relationship to the rubber roll.

An object of the invention is to provide long wearing turning bearings for the trigger and the cam so as to avoid the heretofore need for frequent replacement of cams and triggers.

Another object is to provide a cam bearing not requiring oil so that the hitherto necessary care to prevent the oil from reaching the roll is avoided.

Still another object is to reduce the number of parts requiring frequent oiling in the line casting machine.

Yet another object of the invention is to provide bearings for these parts that need no oil. The use of oil on the trigger normally is satisfactory to minimize wear when the trigger and cam bearings respectively, are of brass turning on steel pins, but experience has shown that the bearings must be oiled once a week (Intertype Book of Instruction page 436). Since a line casting machine has roughly about a hundred keyboard characters with a corresponding number of cams and triggers, the number of oil points is large. Moreover experience has confirmed the necessity of weekly cleaning of the cams with kerosene and then wiping them dry. These are tedious maintenance operations. Moreover, even with the best clock oil found for this purpose, the ambient temperature of the machine must reach about 75° F. in order to prevent relative slow action of the triggers and cams, especially the latter.

Slow action by one cam with respect to that by another varies the time response of the associated release or escapement mechanisms so that a quickly released mat falls into the "line" before the slowly released one does, even though the key for the more slowly one was depressed before that for the faster. The result of this abnormality is a transposition of mats. The identifying character on the mat is difficult to read and the error goes unnoticed until a proof is printed. Transpositions are frequent after a machine has just been started up. This is especially true during winter if the machine room is not heated during the night and the oil has become slightly congealed. Attempts have been made to lubricate these bearings with graphite, but they were unsatisfactory because the cam must frictionally engage the rubber roll and the confining of the graphite to the bearings was most difficult to effect.

The present invention overcomes these difficulties by the employment of so-called "non-lubricated" bearings on the trigger and cam. Such bearings are of the composition wherein polymerized fluorocarbon fibers are embedded in a matrix of a well known thermosetting or at times thermoplastic resin. Compositions of this nature are already known and as compositions, per se, are not the invention set forth in this application.

In the drawing:
FIG. 1 shows a portion of a conventional keyboard escapement mechanism;
FIG. 2 is a plan of the keyboard cam of the invention;
FIG. 3 is a plan of the trigger of the invention, and
FIG. 4 is a cross sectional view of a bearing used for the cam and suitable for the trigger.

In a conventional line casting machine, a single matrix is released from a magazine by an escapement device (not shown) when a vertical keyrod, shown in part as 10, is raised to a given position. The raising of the keyrod 10 is effected periodically whenever the upper end portion 11 of a keybar of a keyboard (not shown) assumes an upper position due to the depressing of its corresponding key of the keyboard. The interaction of keybar and keyrod is through a constantly rotating shaft 12 provided with a rubber sleeve or roller 14 revolving abouts its longitudinal axis, fixed with respect to the machine, and through other parts shown in FIG. 1 described next below.

Normally, with the keybar 11 in lower position, an L-shaped trigger 15 pivoted on the machine by a pin 16, and having horizontal and vertical legs 18 and 19, holds a lever-like cam yoke 20 in a neutral position. The cam yoke is pivoted at a fixed point 21 on the machine and extends over the roller 14 where it carries a cam 22 mounted for rotation by a pin 24. When the cam is stopped by a stop 25 in non-engageable position with respect to the roller the system is inactive except for the rotation of the roller.

When a key is depressed and the keybar 11 is raised, the bar, receiving the leg 18 in a lateral notch 26, turns the trigger so that the vertical leg 19 slips from under a lug 28 on the cam yoke outer end 27, allowing the yoke and cam to fall.

As the cam falls its lower serrated edge portion 29 engages the roller and the detent 30 clears the stop 25. Rotation of the roller turns the eccentric cam 22 causing the yoke end 27 to rise and elevate the keyrod 10 and release a single matrix. The yoke 20 will continue to oscillate up and down with repeated releases of a matrix from the same chute for each rotation of the cam until the key is no longer depressed and the trigger is swung back to position for engaging the lug 28.

So far the description of this portion of a line casting machine contains nothing new.

The novelty of the invention is in the materials used for the pivot bearings of the trigger and cam.

The bearings of the trigger and cam at 16 and 24 are bushings 31 of synthetic resin as a matrix or body 32 and containing discrete fibers 34 of fluorocarbon polymer plastic well known to the trade as "Teflon." The particular composition used was obtained from the A. L. Hyde Company, Grenlock, New Jersey, in rod form under the name of HAC-22-T a composition of 22% Teflon fibers 32 and 78% by weight acetal resin known to the trade as "Delrin." Physical properties of the composition and resin are:

PHYSICAL PROPERTIES (73° F. AND 50% RELATIVE HUMIDITY)

| | HAC-22-T | 100% Delrin |
|---|---|---|
| Flex. Modulus (p.s.i.) | 414,000 | 410,000 |
| Tensile Strength (p.s.i.) | 6,900 | 10,000 |
| Tensile Modulus (p.s.i.) | 467,000 | 450,000 |
| Elongation at Break (percent) | 12 | 15 |
| Izod Impact (ft. lbs./in.) | .86 | 1.4 |
| Compressive Resistance (p.s.i.): | | |
| 2% Deformation | 6,020 | 8,550 |
| 5% Deformation | 9,930 | 14,200 |
| 10% Deformation | 12,800 | 18,100 |
| Specific Gravity | 1.59 | 1.42 |

The preformed Teflon fibers are uniformly incorporated in the rod during manufacture of the rod and the fibers are approximately 1/64 inch long and 0.8 mil in diameter. It is understood that 22% Teflon loaded Delrin is manufactured to utilize the rigidity and creep resistance of Delrin acetal resin, and that where the load on the bearing is light the fibers may be incorporated in more conventional resins such as the phenolics of formaldehyde or urea. The production of acetal resins is described in Patents 2,848,500, 2,943,701, 2,994,687 and 3,043,803.

Test bearings bushings about 3/16 inch in diameter and 0.222 in length of the above mentioned HAC-22-T composition for the cams were installed in a tape regulated Linotype machine for a Metropolitan New York newspaper and the bearing run on Monel metal pins of about 0.093 inch in diameter, with approximately between 0.0001 and 0.0015 inch clearance. The bearings were not oiled. No detectable wear on the bearings could be observed after over eight months of service. Moreover the rubber sleeve was still in good condition, while under like conditions of operation the sleeve had to be replaced every two or three months when oiled bearings were used. There was no trouble from binding of the cams. Binding of the cams usually is caused by dissipation of oil at the cams. Here the dry bearings required no oiling. The machine produced no transpositions or the like which could be traced to the action of the cams even when started cold. Stainless steel pins may be used.

Conventionally, the pivot at 16 is actually a rod on which a large number of the triggers are carried and heretofore this rod was lubricated with graphite. It has been found that the same Teflon material for the cam bearings is well suited for the trigger bearings and no graphite is necessary. While the absence of graphite here is not as desirable as the absence of oil from the cam bearing, nonetheless there is no danger of getting graphite on the roller or of getting oil on the trigger to cause sticking of the trigger key with consequent doubling or repetition of characters.

It is understood that the proportion of Teflon fibers to the resin matrix of the bushing is not altogether critical. Teflon fiber bearings are well known. The high temperature stability of Teflon has enabled its fibers to be incorporated in various types of synthetic resins for use as bearing material. It is contemplated that under usage described for the invention the fiber content may be as low as 20% and as high as 25% by weight. The present invention is not so much concerned with the production of the bearing material as with the physical properties of the material such as is available on the market. No difficulty was encountered in obtaining the bearing material.

The invention concerns, primarily, the elimination of the need for maintenance lubrication, and so avoids glazing or softening of the roller and stiffening at a low temperature.

In laboratory tests, cams mounted as described above have been continuously operated under simulated use with no lubrication, maintenance or cleaning. Examinations at the end of one, five and ten million cycles have revealed no signs of wear on the bushings.

The use of Teflon fiber loaded acetal resin is contemplated in typewriters, computers and data processing machines as bearing bushings which require oiling in the conventional typewriter and machines, but these usages generally differ from use in line casting machines because the latter includes the rubber roller which is especially damaged by oil.

The invention claimed is:

1. In a type line casting machine having a keyboard cam for engagement with a continuously rotating roller and wherein the cam is mounted on a yoke for rotation, the improvement of a bearing bushing through the cam and consisting essentially of substantially rigid synthetic resin matrix loaded with polymerized fluorocarbon fibers, and a metal pin on the yoke passing through the bushing and carrying the cam.

2. In a type line casting machine as claimed in claim 1, said bushing having between 20% and 25% content of the loaded fibers.

3. In a type line casting machine as claimed in claim 1, the fibers being of the order of 0.8 mil in diameter and 1/64 inch long and amounting to between 20% and 25% of the weight of the bushing.

4. In a type line casting machine having a trigger and cam for relating the feed of type matrices to movement of keybars, bearing bushings through the trigger and cam respectively, the bushings consisting essentially of substantially rigid synthetic resin loaded with polymerized fluorocarbon fibers as antifriction material, and a metal pin carrying the bushing.

References Cited by the Examiner

UNITED STATES PATENTS

| 2,773,781 | 12/1956 | Rodman. |
| 2,934,203 | 4/1960 | Nause _____ 199—18 |
| 2,998,397 | 8/1961 | Riesing. |

OTHER REFERENCES

Publication: "Automotive Industries," September 1, 1954, pages 107–108, article on "Teflon" For Use in Bearings.

ROBERT E. PULFREY, *Primary Examiner.*

EUGENE R. CAPOZIO, *Examiner.*

N. M. ELLISON, *Assistant Examiner.*